United States Patent
Haaland et al.

(10) Patent No.: US 12,270,654 B2
(45) Date of Patent: Apr. 8, 2025

(54) SYSTEMS AND METHODS FOR PROVIDING MULTIPLE STRAPDOWN SOLUTIONS IN ONE ATTITUDE HEADING AND REFERENCE SYSTEM (AHRS)

(71) Applicant: L3 Technologies, Inc., New York, NY (US)

(72) Inventors: David D. Haaland, Grand Rapids, MI (US); Paul Voisin, Grand Rapids, MI (US)

(73) Assignee: L3HARRIS AVIATION PRODUCTS, INC., Grand Rapids, MI (US)

( * ) Notice: Subject to any disclaimer, the term of this patent is extended or adjusted under 35 U.S.C. 154(b) by 319 days.

(21) Appl. No.: 17/671,744

(22) Filed: Feb. 15, 2022

(65) Prior Publication Data

US 2022/0170747 A1  Jun. 2, 2022

Related U.S. Application Data

(63) Continuation-in-part of application No. 16/352,423, filed on Mar. 13, 2019, now abandoned.

(60) Provisional application No. 62/642,324, filed on Mar. 13, 2018.

(51) Int. Cl.
*G01C 21/16* (2006.01)

(52) U.S. Cl.
CPC .................... *G01C 21/16* (2013.01)

(58) Field of Classification Search
CPC ............... G01C 21/16; G01C 25/005
See application file for complete search history.

(56) References Cited

U.S. PATENT DOCUMENTS

| 9,217,643 | B1* | 12/2015 | Belenkii | G01C 21/025 |
| 11,113,873 | B1* | 9/2021 | Bosse | G06T 19/20 |
| 2016/0047675 | A1* | 2/2016 | Tanenhaus | G01C 25/005 |
| | | | | 702/104 |
| 2016/0216119 | A1 | 7/2016 | Omr et al. | |

(Continued)

FOREIGN PATENT DOCUMENTS

JP  2004110802  4/2004

OTHER PUBLICATIONS

Examination Report No. 1, dated Oct. 12, 2023 (Oct. 12, 2023), 4 pages, issued on related Australian Patent Application 2019235789 issued by IP Australia, Australian Government.

*Primary Examiner* — Ig T An
(74) *Attorney, Agent, or Firm* — DICKINSON WRIGHT PLLC

(57) ABSTRACT

An inertial navigation system and method are provided. The system includes a plurality of three-axis sensors and a controller operatively coupled to the plurality of three-axis sensors. The method includes the controller: receiving an output from each of a plurality of three-axis sensors; determining a plurality of solutions, each of the plurality of solutions based on the output of one of the plurality of three-axis sensors; applying a Gaussian curve to the plurality of solutions; weighting each of the plurality of solutions based on a position on the Gaussian curve of each of the plurality of solutions, thereby determining a plurality of weighted solutions; calculating a roll, a pitch, and a heading of a device based on the plurality of weighted solutions; and iteratively repeating the receiving, determining, applying, weighting, and calculating.

6 Claims, 4 Drawing Sheets

(56) References Cited

U.S. PATENT DOCUMENTS

2018/0257688 A1     9/2018  Carter et al.
2020/0293066 A1*    9/2020  Shibata .................. G01S 19/40

* cited by examiner

SYSTEMS AND METHODS FOR PROVIDING MULTIPLE STRAPDOWN SOLUTIONS IN ONE ATTITUDE HEADING AND REFERENCE SYSTEM (AHRS)

CROSS-REFERENCE TO RELATED APPLICATIONS

This application is a Continuation-in-part of U.S. application Ser. No. 16/352,423, filed Mar. 13, 2019, which Application claims the benefit of U.S. Provisional Application 62/642,324, filed Mar. 13, 2018, the disclosures of which are hereby incorporated herein by reference in their entireties.

BACKGROUND

1. Field

Apparatuses and methods consistent with exemplary embodiments relate Various systems benefit from suitable mechanisms and methods for dealing with sensor inaccuracy. For example, various attitude and heading reference system (AHRS) approaches may benefit from systems and methods for providing multiple strapdown solutions.

2. Description of the Related Art

An inertial strapdown system may use rate sensors and accelerometers to compute, among other things, roll, pitch, and heading, and in some cases position. If one of these sensors fails, or is not accurate enough for any reason, for example due to a noise source, the attitude (roll and pitch) and heading may become either invalid or inaccurate.

A Built-In-Test (BIT) can detect sensor failures and mark the output of a sensor as failed when the sensor fails its BIT. However, one shortcoming of such a solution is the loss of attitude/heading when a sensor fails in the field. Furthermore, it is difficult to design a BIT such that the attitude/heading solution of a failing sensor is marked as invalid before it becomes too highly inaccurate, but is not needlessly marked as invalid. In other words, it is hard to balance between trusting inaccurate data (BIT doesn't fail when it should) and generating false or spurious reports of failure (BIT fails when it shouldn't).

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, an inertial navigation method is provided comprising: receiving, at a controller, an output from each of a plurality of three-axis sensors; determining, by the controller, a plurality of solutions, each of the plurality of solutions based on the output of one of the plurality of three-axis sensors; applying, by the controller, a Gaussian curve to the plurality of solutions; weighting, by the controller, each of the plurality of solutions based on a position on the Gaussian curve of each of the plurality of solutions, thereby determining a plurality of weighted solutions; calculating, by the controller, a roll, a pitch, and a heading of a device based on the plurality of weighted solutions; and iteratively repeating the receiving, determining, applying, weighting, and calculating.

The inertial navigation method may further comprise outputting the roll, the pitch, and the heading of the device at each iteration.

The Gaussian curve may be a Probability Distribution Function.

The Gaussian curve may be one of a Cauchy Distribution and a Logistic Distribution.

The applying, the weighting, and the calculating may comprise: applying, by the controller, a first Gaussian curve to a first selection of the plurality of solutions related to the roll and pitch of the device; applying, by the controller, a second Gaussian curve to a second selection of the plurality of solutions related to the heading of the device; weighting, by the controller, each of the first selection of the plurality of solutions based on a position on the first Gaussian curve of each of the first selection of the plurality of solutions, thereby determining a first plurality of weighted solutions; weighting, by the controller, each of the second selection of the plurality of solutions based on a position on the second Gaussian curve of each of the second selection of the plurality of solutions, thereby determining a second plurality of weighted solutions; calculating, by the controller, the roll and the pitch of the device based on the first plurality of weighted solutions; and calculating, by the controller, the heading of the device based on the second plurality of weighted solutions.

According to an aspect of an example embodiment, an inertial navigation system is provided comprising: a plurality of three-axis sensors, each configured to measure physical quantities from which can be computed a roll, a pitch, and a heading of a device; a controller, operatively coupled to each of the plurality of three-axis sensors, the controller configured to perform operations of: receiving an output from each of the plurality of three-axis sensors; determining a plurality of solutions, each of the plurality of solutions based on the output of one of the plurality of three-axis sensors; applying a Gaussian curve to the plurality of solutions; weighting each of the plurality of solutions based on a position on the Gaussian curve of each of the plurality of solutions, thereby determining a plurality of weighted solutions; calculating the roll, the pitch, and the heading of the device based on the plurality of weighted solutions; and iteratively repeating operations of the receive, the determine, the apply, the weight, and the calculate.

According to an aspect of an example embodiment, a non-transitory computer-readable medium is provided, encoded with instructions that, when executed in hardware, perform an inertial navigation process comprising: receiving, at a controller, an output from each of a plurality of three-axis sensors; determining, by the controller, a plurality of solutions, each of the plurality of solutions based on the output of one of the plurality of three-axis sensors; applying, by the controller, a Gaussian curve to the plurality of solutions; weighting, by the controller, each of the plurality of solutions based on a position on the Gaussian curve of each of the plurality of solutions, thereby determining a plurality of weighted solutions; calculating, by the controller, a roll, a pitch, and a heading of a device based on the plurality of weighted solutions; and iteratively repeating the receiving, determining, applying, weighting, and calculating.

BRIEF DESCRIPTION OF THE DRAWINGS

The above and/or other aspects will become apparent and more readily appreciated from the following description of example embodiments, taken in conjunction with the accompanying drawings, in which.

The accompanying drawings are provided for purposes of illustration and not by way of limitation.

DETAILED DESCRIPTION

Figure 1:
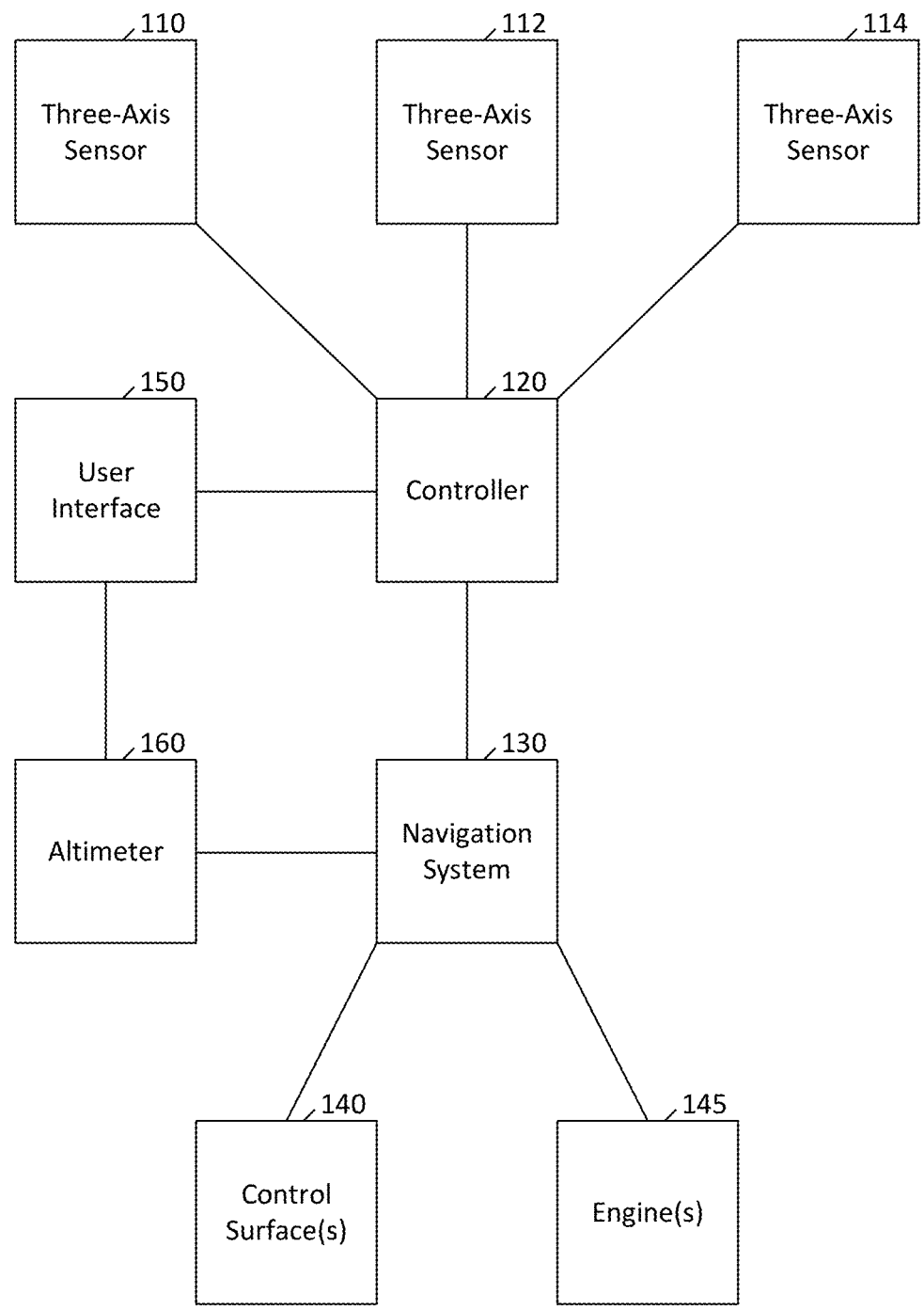
FIG. 1 illustrates a system according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of" when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

One or more example embodiments may provide additional reliability for inertial strapdown systems using multiple redundant sensors. If multiple sensors are used (for example, multiple three-axis rate sensors, multiple accelerometers, both, or any other desired multiple sensors), and multiple strapdown solutions are calculated, the resulting roll, pitch, heading and any other desired values can be combined using a desired algorithm, such as a weighted average, to compute a more reliable output than one that depends on just one of each type of sensor.

One or more example embodiments may enhance reliability in two ways: (1) the solution may be less affected by noise in the sensors, because the sensors' noise may, to a certain extent, cancel each other out and (2) a RIT can be done by simply comparing the output roll, pitch, and heading of the multiple sensors, and if one strapdown solution differs from the others by some threshold amount, that solution can be ignored in the combined output. The combined output need not be invalidated just because one or more of the solutions is not used. As long as a sufficient minimum number of solutions agree with each other, the combined output can be considered valid. In this way, redundancy of multiple inertial systems may be achieved within one inertial product.

One or more example embodiments may be used with avionics, space vehicles, guided weapons, such as missiles, hand-held devices, or any other application which may use an inertial strapdown solution for computing one or more of roll, pitch, heading, position (or any other desired parameter).

Sensor Arrangement

One or more example embodiments may implement multiple strapdown solutions in a single Attitude and Heading Reference System (AHRS) product (or, if desired, in multiple AHRS products). One or more example embodiments may provide a product that may contain multiple sets of three rate sensors: x, y, and z. Each set of x, y, and z sensors may be in a single three-axis package, or may include three separate packages arranged orthogonally. The multiple sets of three packages may be arranged to have all of their x axes parallel, y axes parallel, etc. Alternatively, they may be arranged to have the first sensor's positive x axis parallel to the second sensor's positive y axis, the first sensor's positive y axis parallel to the second sensor's negative x axis, and so on. They may even be arranged in a non-parallel manner, for instance, one x axis may point into the middle of the first (or second, or third, etc.) octant of another three-axis triad. In all these cases, the rates generated from the sensors can be mathematically rotated to provide multiple rate vectors in the same three-dimensional Cartesian reference system. The number of x-y-z triads could be increased by combining axes from different sensor triads. For instance, the x axis from sensor 1 with the y and z axes from sensor 2. In this manner, as many as eight different three-dimensional rate vectors could be generated from two three-axis sensor triads. Each three-dimensional rate vector may then be fed into its own strapdown algorithm to compute its own set of roll and pitch (and heading, if a heading reference, such as a magnetometer, is provided).

Combining the Outputs of the Individual Strapdown Solutions when One Sensor, of a Plurality of Sensors, Fails As long as all of the sensor triads are providing accurate, valid data, the combining of the strapdown outputs (e.g., roll, pitch and heading) can be straightforward: they can simply be averaged. However, if one sensor triad fails, there may be a graceful way to drop this sensor's strapdown solution from the average without causing steps in the output. In other words, the output, roll, pitch and heading, can be smooth as the combined solution transitions from using all of the sensors, to using all except one triad.

One or more example embodiments may provide a solution that utilizes a weighted average or another suitable solution. At each iteration of a new output (e.g., roll, pitch and heading), the median of the strapdown outputs may be computed. All solutions that are within some defined limit (e.g., call it limit 1) of the median may receive a weight of 1. As the difference between a particular solution and the median moves from limit 1 to some outer limit (e.g., limit 2), the weight may transition from 1 to zero (e.g., it could go linearly between 1 and zero, or by some non-linear formula or any other desired transition). When the difference is beyond limit 2, that solution may have a weight of zero, and may not be included in the combined solution. One reason for using the median instead of the mean may be that as one solution begins to move away from the others, the median does not move off with it, whereas the mean does.

Circular Median and Circular Weighted Mean

According to an example aspect, for roll and heading, a circular version of the median and weighted mean may be computed. A circular median may be computed by taking the sine and cosine of all the angles, finding the median of the sines and cosines, and computing the quadrant-specific arctangent using the median sine and cosine. A weighted circular mean may be computed by taking the sines and cosines of all the angles, and computing a weighted mean of the sines and cosines. Then, the quadrant-specific arctangent may be computed from the weighted mean of the sines and the weighted mean of the cosines. For pitch, a simple median and weighted mean can be used, or a circular version. This is because the range for pitch is only +/−90 degrees.

Output Validity

According to this example embodiment, the attitude validity may be determined not by testing the individual sensors, but by comparing the output attitude/heading solutions. If one solution begins to drift away from the others, it may be dropped—gradually phased out by the weighting scheme described above (or any other suitable scheme). In order for the combined solution to remain valid, a minimum number of solutions can be established, and that minimum number of solutions may be maintained within some minimum range of the median (described above). Heading validity may be established separately from roll/pitch validity, because in some installations there may be no heading reference (such as a magnetometer), so the system outputs roll and pitch.

FIG. 1 illustrates a system according to an example embodiment. As shown in FIG. 1, a system can include a plurality three-axis sensors 110, 112, 114. There can be more or fewer than three such sensors. Moreover, the sensors may be other kinds of sensors, such as two-axis sensors or eight-axis sensors. These sensors, therefore, are provided as an illustration and not by way of limitation.

Each of sensors 110, 112, 114 may be a strapdown sensor. A strapdown sensor may be a sensor that does not require an inertial platform as a mounting point, but may be strapped down at any desired place on a vehicle. The particular mounting mechanism of strapping with straps is not required. Optionally, sensors 110, 112, 114 may be mounted to a rotating platform.

The system can also include controller 120. Controller 120 can be any suitable hardware device, such as an application specific integrated circuit (ASIC) or central processing unit (CPU). For example, controller 120 may be one or more chip in a line replaceable unit (LRU). According to one or more example aspects, the controller 120 may be packaged together with the sensors 110, 112, 114. Alternatively, or in addition, the controller 120 may be part of a vehicle guidance system of a vehicle. The vehicle may be, for example, an unmanned aerial vehicle (UAV) or other vehicle.

Controller 120 may be configured to receive, as inputs, the outputs of sensors 110, 112, 114. The sensors 110, 112, 114 may provide raw outputs or signals representative of roll, pitch, and optionally heading. The sensors 110, 112, 114 may provide roll, pitch, and heading in a coordinate system of the corresponding sensor. The controller 120 may then be calibrated to interpret the sensor data with a predetermined motion of the device, by comparison to other known values, or any other desired way.

Optionally, the controller 120 may determine each of a plurality of strapdown solutions. Each strapdown solution may provide roll and pitch. Optionally, each strapdown solution may also include heading. The controller 120 may weight each solution, or part thereof, based on a relation between a given output and the other outputs.

There are various ways that this weighting can be done. For example, the controller 120 may determine a median of the solutions, and may weight each solution based on a relation between a given input and the mean. The controller 120 may then determine roll, pitch, and heading for the device based on the weighted plurality of inputs.

According to one or more example embodiments, the weighting can take account of the roll and pitch separately, while in other example embodiments, roll and pitch can be weighted together. According to one or more example embodiments, heading may be performed by a different underlying sensor type. Thus, in certain example embodiments, the heading may be weighted separately from pitch and roll, even when pitch and roll are weighted together.

The controller can be configured to weight a given solution with a weight of 1 when the given solution is within a first predetermined threshold of the median. The controller can be configured to weight the given solutions with a weight that scales from 1 to 0 when the given solution is beyond the first predetermined threshold of the median but within a second predetermined threshold of the median. This scaling can be a linear scale or any other desired scale. The use of a linear scale may permit a relatively smooth and graceful transition from a solution being considered and a solution being eliminated. The controller can be configured to weight the solution with a weight of 0 when the given output input is beyond the second predetermined threshold of the median. This can be a way in which the solution can be considered as invalid.

After a predetermined time of a sensor's solution being weighted as zero, that solution can be removed from consideration, even as to determining a median. In some cases, this may mean removing the entire sensor from consideration or merely removing a particular roll, pitch, or heading solution from consideration. According to one or more example embodiments, the heading solution may be removed from consideration while the roll and pitch solutions may continue to be considered. This approach may have an advantage of permitting sensors to continue in partial use.

The median of at least one of the roll, the pitch, or the heading can be determined by computing a circular median or mean, as explained above. This calculation can be performed by the controller 120.

The controller 120 can report the roll, pitch, and heading of the device, for example to a navigation system 130 of the device. The navigation system 130 of the device may, for example, be an autopilot system. The navigation system 130 may include its own memory, processors, computer program instructions, and the like. Alternatively, the navigation system 130 may integrated with the controller 120 as a single unit, including by way of example only as a single chip.

The navigational system 130 may, based on output of the controller, provide commands to control surface(s) 140 of the device and/or provide commands to engine(s) 145 of the device. For example, the navigational system 130 may determine that a roll, pitch, or heading of the device should be altered, and consequently may send a message to a rudder, as an example of control surface(s) 140, to change positions. In a copter-based implementation, such as a quadcopter or any other multirotor helicopter, the engine(s) 145 may similarly have its speed adjusted by the navigation system 130 to correct a roll, pitch, or heading to a desired roll, pitch, or heading based on information provided from the controller 120 based on data sourced by three-axis sensors 110, 112, 114.

The controller 120 may also provide information, based on data sourced by three-axis sensors 110, 112, 114, to at least one user interface 150. the interface may be a user interface of a navigational display either in the device (as shown in FIG. 1) or remote from the device (not pictured). The user interface 150 may have its own graphics card, display, processor, and memory, or may be integrated with the controller 120. The user interface 150 may use the information from controller 120 to display the device and/or the environment of the device in an appropriate attitude. The user interface 150 and navigation system 130 may receive additional information from other units, such as from an altimeter 160, which may be a barometric altimeter.

Figure 2:
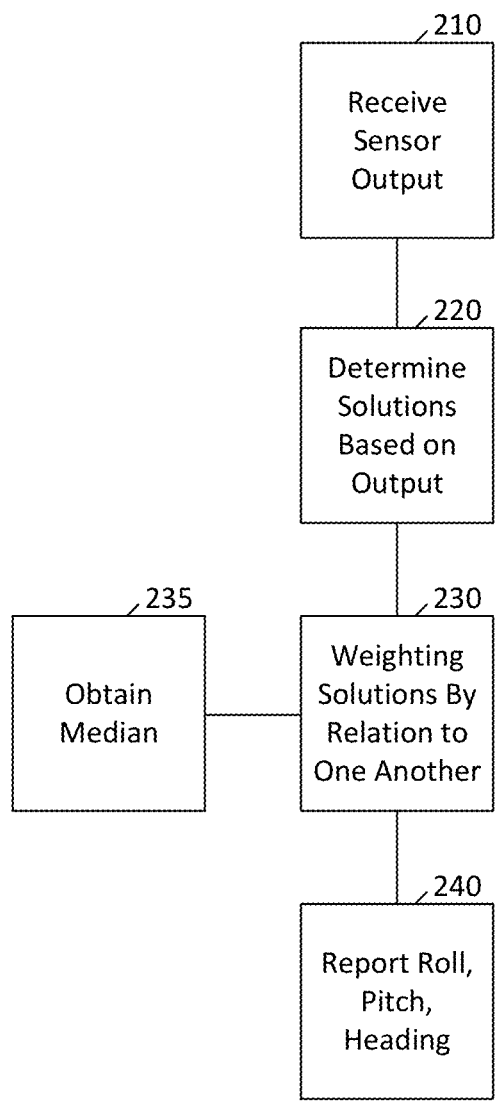
FIG. 2 illustrates a method according to an example embodiment.

FIG. 2 illustrates a method according to an example embodiment. The method of FIG. 2 may, for example, be implemented using the system of FIG. 1. The method of FIG. 2 can include, at 210, receiving, at a controller, output of a plurality of three-axis sensors configured to measure physical quantities (e.g. acceleration, rotational rate), from which can be computed roll, pitch, and heading for a device. This may be controller 120 and sensors 110, 112, and 114 in FIG. 1, for example.

The method of FIG. 2 can also include, at 220, determining, by the controller, a plurality of solutions each solution of the plurality of solutions based on respective output of the plurality of three-axis sensors. The method can further include, at 230, weighting, by the controller, each of the plurality of solutions based on a relation between a given solution and the other solutions of the plurality of solutions. The weighting can be performed separately for heading.

The method can additionally include, at 240, reporting, by the controller, the roll, pitch, and heading of the device. According to one or more example embodiments, only the roll and pitch may be reported. The reporting can include reporting the roll, pitch, and heading of the device to a navigation system, to a user interface of an aircraft, or to both. Reporting to other devices is also permitted.

The method can include, at 235, obtaining a median of the plurality of solutions. Thus, the relation by which the weighting occurs can be a relation to the median. The median of at least one of the roll, the pitch, or the heading can be determined by computing a circular median or circular mean, as described above.

The weighting can include weighting a given solution of the plurality of solutions with a weight of 1 when the given solution is within a first predetermined threshold of the median. The weighting can also include weighting the given solution of the plurality of solutions with a weight that scales from 1 to 0 when the given solution is beyond the first predetermined threshold of the median but within a second predetermined threshold of the median. The weighting can further include weighting the given solution of the plurality of solutions with a weight of 0 when the given solution is beyond the second predetermined threshold of the median.

Weighting Outputs of Strapdown Solutions Using Application of Gaussian Curve

According to one or more example embodiments, a Gaussian curve may be iteratively determined for the outputs, including one or more of roll, pitch, and heading, of multiple sensors, and a weight may be applied to one or more of the sensor outputs based on the Gaussian curve.

Noise may be assumed to be additive white Gaussian. A variance of noise is estimated from the median value of the wavelet coefficients at the first scale. Then, a threshold is determined that is based on normalizing the noise distribution. Noisy coefficients and the best threshold may be determined. The inverse wavelet transform is then performed, and the resulting signal is the denoised signal.

However, according to one or more example embodiments, rather than removing white noise by assuming that the noise has a Gaussian profile, a Gaussian curve may be iteratively applied to the sensor outputs, and the sensor outputs may then be iteratively weighted based on their position on the curve. This iterative application of the Gaussian profile, and iterative weighting may avoid a step response in which one sample/sensor output goes from being considered to being omitted entirely. The weighting of samples/sensor outputs may be linearly reduced. When the Gaussian curve is applied iteratively, at each iteration, the values near the center of the curve may receive full or near full weighting, while values closer to the tails of the function may receive less, near zero, or zero weight, as they approach the end of the tail.

Figure 3:
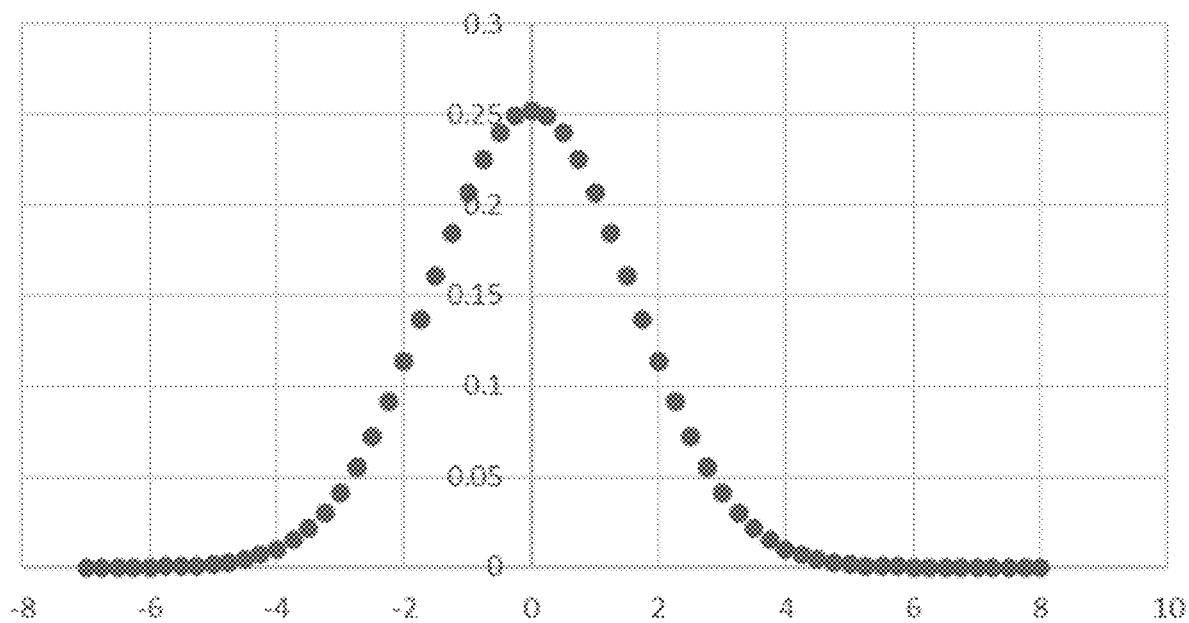
FIG. 3 illustrates a Probability Distribution Function (PDF) according to an example aspect.

The Gaussian curve applied may be a Probability Distribution Function (PDF), which is bell-shaped, continuous, and smooth. FIG. 3 illustrates a PDF according to an example aspect. Alternately, any of a variety of other curve types may be used, including, but not limited to a Cauchy Distribution, and a Logistic Distribution.

Figure 4A:
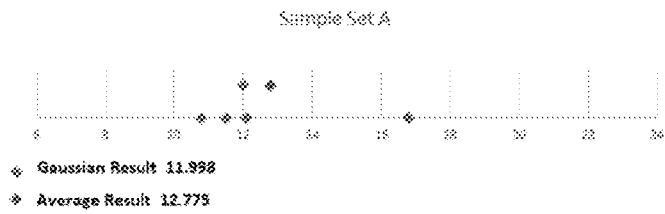
FIGS. 4A and 4B illustrate differences in results between applying an average weighting method and applying a Gaussian method to a sample set A, and a sample set B, respectively, according to an example embodiment.
Figure 4B:
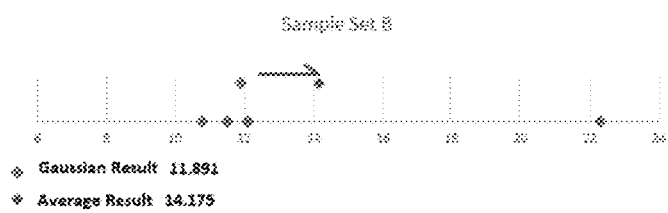

FIG. 4A illustrates a difference in results between applying an average weighting method and applying a Gaussian method according to this example embodiment, to a sample set A: 12.1, 11.5, 10.8, and 16.7; and FIG. 4B illustrates a difference in results between applying an average weighting method and applying a Gaussian method according to this example embodiment, to a sample set B: 12.1, 11.5, 10.8, and 22.3. In sample set A, a single outlier is 16.7, while in sample set B, the single outlier is 22.3. It is evident that, with respect to the average result, the output shifted somewhat substantially from 12.775 to 14.175 from sample A to sample B, due to the effect of the outlier. However, the Gaussian weighted output shifted only slightly from 11.998 to 11.891, discounting the faulty sensor represented by the outlier. In these examples of FIGS. 4A and 4B, the width of the Gaussian distribution (weights) is a linear function of the difference between the maximum and minimum samples. The center of the Gaussian distribution is the average of all the samples. Therefore, according to an example embodiment of the solution, the width and the center of the weighting curve moves with the sample set. These adjustments may be calculated by one of skill in the art.

According to one or more example embodiments, a Gaussian curve may be applied to sensor outputs related to the roll and pitch of a device, and a different Gaussian curve may be applied to sensor outputs related to the heading of a device. In this way, the solutions related to the roll and pitch of the device may be weighted differently than the solutions related to the heading of the device.

Figure 4C:
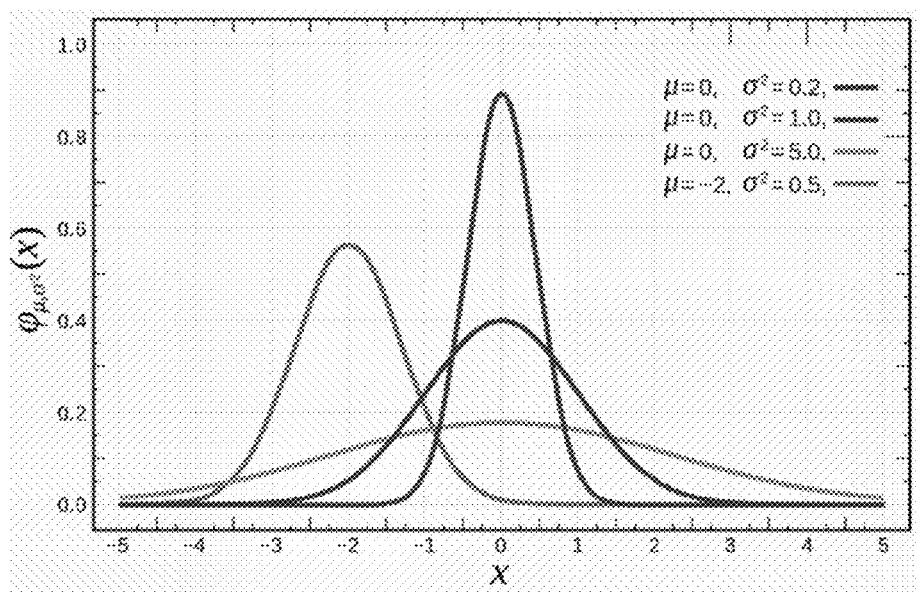
FIG. 4C illustrates examples of Gaussian curves with different centers and weights.

FIG. 4C illustrates examples of Gaussian curves with different centers and weights.

Example embodiments described above may be practically applied in an aircraft, such as a UAV. Nevertheless, one or more example embodiments may be used in any of a variety of manned and unmanned aircraft, including rotorcraft, spacecraft, UAVs, and missiles, in any of a variety of manned and unmanned watercraft, including surface craft, hovercraft, and submarines, and in hand-held devices. Other practical implementations and use cases are also considered.

It may be understood that the exemplary embodiments described herein may be considered in a descriptive sense only and not for purposes of limitation. Descriptions of features or aspects within each exemplary embodiment may be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. An inertial navigation method of a vehicle, the method comprising:
   receiving, at an integrated circuit of the vehicle, at each of a plurality of iterations, data comprising one or more physical quantities from a first three-axis sensor and a second three-axis sensor;
   at each of the plurality of iterations:
      determining a plurality of solutions of a roll of the vehicle, based on the data,
      determining a plurality of solutions of a pitch of the vehicle, based on the data, and
      determining a plurality of solutions of a heading of the vehicle based on the data; at each of the plurality of iterations:
      determining a first Gaussian curve based on the plurality of solutions of the roll of the vehicle,
      determining a second Gaussian curve based on the plurality of solutions of the pitch of the vehicle, and
      determining a third a Gaussian curve based on the plurality of solutions of the heading of the vehicle;
   at each of the plurality of iterations:
      applying the first Gaussian curve to the plurality of solutions of the roll of the vehicle and weighting the plurality of solutions of the roll of the vehicle based on a position of the first Gaussian curve, thereby determining a plurality of weighted solutions of the roll of the vehicle,
      applying the second Gaussian curve to the plurality of solutions of the pitch of the vehicle and weighting the plurality of solutions of the pitch of the vehicle based on a position of the second Gaussian curve, thereby determining a plurality of weighted solutions of the pitch of the vehicle,
      applying third Gaussian curve to the plurality of solutions of the heading of the vehicle and weighting the plurality of solutions of the heading of the vehicle based on a position of the third Gaussian curve, thereby determining a plurality of weighted solutions of the heading of the vehicle;
   at each of the plurality of iterations:
      calculating a combined roll of the vehicle based on the plurality of weighted solutions of the roll of the vehicle,
      calculating a combined pitch of the vehicle based on the plurality of weighted solutions of the pitch of the vehicle, and
      calculating a combined heading of the vehicle based on the plurality of weighted solutions of the heading of the vehicle; and
   at each of the plurality of iterations: controlling an engine of the vehicle based on the combined roll of the vehicle, the combined pitch of the vehicle, and the combined heading of the vehicle.

2. The inertial navigation method of the vehicle according to claim 1, wherein, at each of the plurality of iterations, the controlling the engine of the vehicle comprises outputting the combined roll of the vehicle, the combined pitch of the vehicle, and the combined heading of the vehicle to a navigation system of the vehicle and the navigation system of the vehicle controlling the engine of the vehicle.

3. The inertial navigation method according to claim 1, wherein the first Gaussian curve is a first Probability Distribution Function, the second Gaussian curve is a second Probability Distribution Function, and the third Gaussian curve is a third Probability Distribution Function.

4. A vehicle comprising:
   an engine; and
   as inertial navigation system comprising:
      a first three-axis sensor and a second three-axis sensor configured to measure one or more physical quantities;
      a memory storing instructions thereon;
      a controller, operatively coupled to the first three-axis sensor and the second three-axis sensor, the controller configured to execute the instructions and thereby:
         receive, at each of a plurality of iterations, data comprising the one or more physical quantities from the first three-axis sensor and the second three-axis sensor;
         at each of the plurality of iterations, determine a plurality of solutions of a roll of the vehicle, determine a plurality of solutions of a pitch of the vehicle, and determine a plurality of solutions of a heading of a vehicle, based on the data;
         at each of the plurality of iterations, determine a first Gaussian curve based on the plurality of solutions of the roll of the vehicle, determine a second Gaussian curve based on the plurality of solutions of the pitch of the vehicle, and determine a third Gaussian curve based on the plurality of solutions of the heading of the vehicle;
         at each of the plurality of iterations, apply the first Gaussian curve to the plurality of solutions of the roll of the vehicle, apply the second Gaussian curve to the plurality of solutions of the pitch of the vehicle, and apply the third Gaussian curve to the plurality of solutions of the heading of the vehicle;
         at each of the plurality of iterations:
            weigh the plurality of solutions of the roll of the vehicle based on a position on the first Gaussian curve, thereby determining a plurality of weighted solutions of the roll of the vehicle,
            weigh the plurality of solutions of the pitch of the vehicle based on a position on the second Gaussian curve, thereby determining a plurality of weighted solutions of the pitch of the vehicle, and
            weigh the plurality of solutions of the heading of the vehicle based on a position on the third Gaussian curve, thereby determining a plurality of weighted solutions of the heading of the vehicle;
         at each of the plurality of iterations calculate a combined roll of the vehicle, a combined pitch of the vehicle, and a combined heading of the vehicle based on the plurality of weighted solutions of the roll of the vehicle, the pitch of the vehicle, and the heading of the vehicle; and at each of the plurality of iterations, control the engine based on the combined roll of the vehicle, the combined pitch of the vehicle, and the combined heading of the vehicle.

5. The vehicle according to claim 4, further comprising:
a navigational display;
wherein, at each of the plurality of iterations, the controlling the engine comprises outputting, to the navigational display, the combined roll of the vehicle, the combined pitch of the vehicle, and the combined heading of the vehicle; and
wherein the navigational display is configured to control the engine based on the combined roll of the vehicle, the combined pitch of the vehicle, and the combined heading of the vehicle.

6. The inertial navigation system according to claim 4, wherein the first Gaussian curve is a first Probability Distribution Function, the second Gaussian curve is a second Probability Distribution Function, and the third Gaussian curve is a third Probability Distribution Function.

* * * * *